(12) United States Patent
Frommer et al.

(10) Patent No.: US 10,267,060 B2
(45) Date of Patent: Apr. 23, 2019

(54) APPARATUSES AND METHODS FOR COWL LATCH INDICATION

(71) Applicant: THE BOEING COMPANY, Chicago, IL (US)

(72) Inventors: Joshua B. Frommer, Seattle, WA (US); Andrew C. Kulak, Seattle, WA (US); Michael P. Roethle, Ladson, SC (US); Leslie R. Neill, Issaquah, WA (US); Paul E. Hermanson, Renton, WA (US); Rhoda Rebecca Toliver, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 196 days.

(21) Appl. No.: 15/386,829

(22) Filed: Dec. 21, 2016

(65) Prior Publication Data

US 2018/0171664 A1    Jun. 21, 2018

(51) Int. Cl.
*E05B 41/00*    (2006.01)
*B64D 29/06*    (2006.01)
(Continued)

(52) U.S. Cl.
CPC ............. *E05B 41/00* (2013.01); *B64D 29/06* (2013.01); *B64D 29/08* (2013.01); *F04D 27/001* (2013.01); *F04D 29/522* (2013.01)

(58) Field of Classification Search
CPC ........ B64D 29/06; B64D 29/08; E05B 41/00; F04D 27/001; F04D 29/522
(Continued)

(56) References Cited

U.S. PATENT DOCUMENTS

| 4,150,802 A * | 4/1979 | Evelyn et al. | B64D 29/00 244/54 |
| 4,613,099 A * | 9/1986 | Smith et al. | B64D 29/06 244/129.4 |

(Continued)

FOREIGN PATENT DOCUMENTS

| DE | 2918123 A1 | 11/1980 | |
| EP | 1927711 A2 * | 6/2008 | E05B 63/143 |

OTHER PUBLICATIONS

Extended European Search Report for co-pending European Application No. 17202422.6-1010, dated Jan. 26, 2018 (9 pages).
(Continued)

*Primary Examiner* — R. A. Smith
(74) *Attorney, Agent, or Firm* — Joseph F. Harding; The Small Patent Law Group LLC

(57) ABSTRACT

A latch indication assembly includes a latch and an indicator assembly. The latch is movable between a locked position and an unlocked position, and is configured to secure a fan cowl of an aircraft. The indicator assembly is operably coupled to the latch, and includes an indicator movable between an open position and a closed position responsive to movement of the latch. The indicator extends from an exterior of the fan cowl when in the open position, and is visible from an exterior position proximate at least one of a side or an underside of the aircraft when in the open position. The indicator assembly extends to the open position when the latch is in the unlocked position, and is configured to be retractable to the closed position when the latch is in the locked position.

15 Claims, 8 Drawing Sheets

(51) Int. Cl.
*B64D 29/08* (2006.01)
*F04D 29/06* (2006.01)
*F04D 29/52* (2006.01)
*F04D 27/00* (2006.01)

(58) Field of Classification Search
USPC .................................. 116/28 R; 244/129.4
See application file for complete search history.

(56) References Cited

U.S. PATENT DOCUMENTS

| | | | |
|---|---|---|---|
| 5,518,206 A * | 5/1996 | Arnold et al. | B64D 29/06 244/129.4 |
| 6,382,690 B1 | 5/2002 | Dessenberger | |
| 6,824,175 B2 * | 11/2004 | Porte | B64D 29/06 244/129.4 |
| 7,293,524 B2 | 11/2007 | Darby | |
| 7,802,826 B2 | 9/2010 | Schmitz et al. | |
| 8,191,822 B2 * | 6/2012 | Gallego Pleite et al. | B64D 29/06 116/28 R |
| 8,356,844 B2 | 1/2013 | Baic et al. | |
| 9,246,272 B2 | 1/2016 | Kitchen et al. | |
| 9,289,634 B2 | 3/2016 | Chabod et al. | |
| 9,353,559 B2 * | 5/2016 | Fabre et al. | E05C 19/145 |
| 9,416,569 B1 | 8/2016 | Leone et al. | |
| 9,435,141 B2 | 9/2016 | Tien | |
| 9,701,413 B2 * | 7/2017 | Provost et al. | B64D 29/06 |
| 9,856,034 B2 * | 1/2018 | Marche | B64D 45/0005 |
| 9,988,157 B2 * | 6/2018 | Lee et al. | B64D 29/06 |
| 2015/0021928 A1 | 1/2015 | Garcia De La Torre et al. | |

OTHER PUBLICATIONS

Specification and Drawings as filed for U.S. Appl. No. 15/798,332 entitled "Latch Indication System and Method for a Fan Cowl of an Air Vehicle", (57 pages).

* cited by examiner

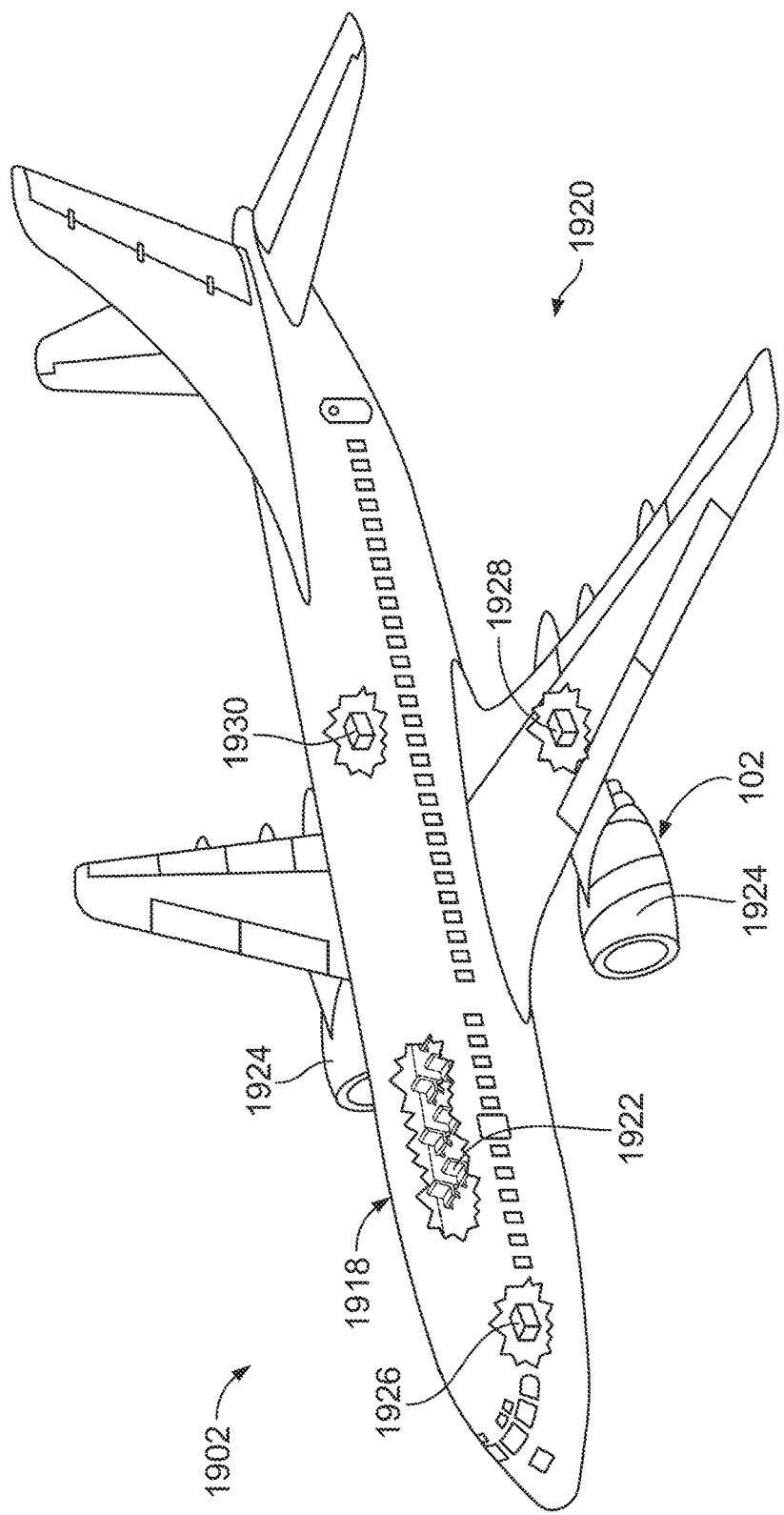

APPARATUSES AND METHODS FOR COWL LATCH INDICATION

FIELD OF EMBODIMENTS OF THE DISCLOSURE

Embodiments of the present disclosure generally relate to cowl latch indication, such as indicating if a cowl latch is locked or unlocked during an aircraft inspection.

BACKGROUND OF THE DISCLOSURE

Cowls of an aircraft may be opened and closed, and secured in place by latches. It may be undesirable for an aircraft to be flown without the latches in a locked condition. For example, one or more standards may call for a reliable means of verifying that cowls are secured prior to each takeoff.

SUMMARY OF THE DISCLOSURE

Accordingly, improvement of cowl latch indication is provided in various embodiments disclosed herein.

Certain embodiments of the present disclosure provide a latch indication assembly that includes a latch and an indicator assembly. The latch is movable between a locked position and an unlocked position, and is configured to secure a fan cowl of an aircraft. The indicator assembly is operably coupled to the latch, and includes an indicator movable between an open position and a closed position responsive to movement of the latch. The indicator extends from an exterior of the fan cowl when in the open position, and is visible from an exterior position proximate at least one of a side or an underside of the aircraft when in the open position. The indicator assembly extends to the open position when the latch is in the unlocked position, and is configured to be retractable or stowed to the closed position when the latch is in the locked position.

Certain embodiments of the present disclosure provide a method. The method includes moving a fan cowl latch of a fan cowl between an unlocked position and a locked position. The method also includes, responsive to the moving the latch, moving an indicator of an indicator assembly between a closed position that is flush with an exterior of the fan cowl and an open position that extends outward from the exterior of the fan cowl.

Certain embodiments of the present disclosure provide a fan cowl assembly. The fan cowl assembly includes a fan cowl, a fan cowl latch, and an indicator assembly. The fan cowl latch is operably coupled to the fan cowl and movable between a locked and unlocked position. The indicator assembly is operably coupled to the fan cowl latch and includes an indicator movable between an open position and a closed position responsive to movement of the fan cowl latch. The indicator assembly extends to the open position when the fan cowl latch is in the unlocked position, and is configured to be retractable to the closed position when the fan cowl latch is in the locked position.

BRIEF DESCRIPTION OF THE DRAWINGS

FIG. 12 is a schematic illustration of an aircraft.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments of the present disclosure provide systems and/or methods for visually indicating the state or position of a fan cowl latch. Various embodiments provide convenient, reliable, and easily observed indication of whether or not a fan cowl latch is in a locked position. Various embodiments include a mechanical cable driven flag or indicator disposed on an external surface of a fan cowl, with the flag or indicator coupled to the to the fan cowl via the cable. Various embodiments provide for enhanced awareness of an unclosed or unlatched condition of a fan cowl latch, and/or reduce the exposure risk time of such an unclosed or unlatched condition (e.g., via indicator location and visibility at all points leading up to takeoff). Various embodiments provide for mechanical connections and indications of latch condition, providing reliability and safety without requiring any electronic indication.

Figure 1:
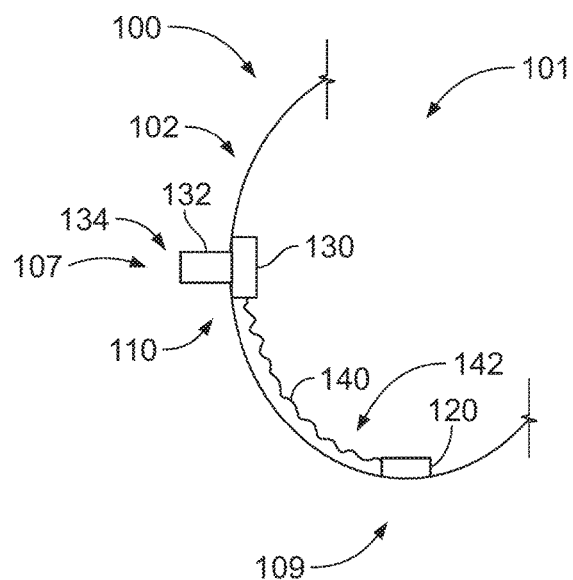
FIG. 1 provides a schematic side view of a fan cowl assembly according to various embodiments of the present disclosure.
Figure 2:
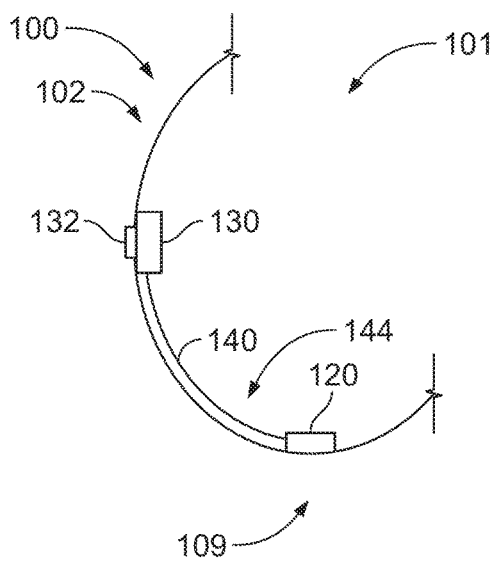
FIG. 2 provides a schematic side view of the fan cowl assembly of FIG. 1 with an indicator in a closed position.

FIGS. 1 and 2 provide a side schematic views of a fan cowl assembly 100 formed in accordance with various embodiments. The fan cowl assembly 100 includes a fan cowl 102 and a latch indication assembly 110. The latch indication assembly 110 includes a cowl latch 120 and an indicator assembly 130. An example fan cowl 102 may also be seen in FIG. 12. The fan cowl 102 may be opened (or removed) to provide access to an engine of an aircraft 101. It may be noted that cowl latch 120 is generally shown toward the bottom of the fan cowl 102 and the latch indication assembly 110 is shown toward the side of the fan cowl 102 in the embodiment illustrated in FIGS. 1 and 2; however, other locations may be employed in alternate embodiments for one or both.

In the depicted embodiment, the cowl latch 120 is operably coupled to the fan cowl 102. The cowl latch 120 is movable between a locked and unlocked position. The cowl latch 120 is configured to secure the fan cowl 102. When the cowl latch 120 is in the locked position, the fan cowl 102 is securely closed. When the cowl latch 120 is in the unlocked position, the fan cowl 102 may be open or unsecurely closed, and it may be undesirable to fly the aircraft 101 with the cowl latch 120 in the unlocked position. Accordingly, in various embodiments, the indicator assembly 130 is configured to provide a convenient, reliable indication of the state of the cowl latch 120.

The example indicator assembly 130 depicted in FIGS. 1 and 2 includes an indicator 132 that is movable between an open position 134 and a closed position 136. The indicator assembly 130 is shown in the open position 134 in FIG. 1 and in the closed position 136 in FIG. 2. The indicator assembly 130 is coupled to the cowl latch 120, and is movable between the open position 134 and the closed position 136 responsive to movement of the cowl latch 120. In the depicted example, the indicator assembly 130 extends to the open position 134 when the cowl latch 120 is in the unlocked position. Also, the indicator assembly 130 is configured to be retractable to the closed position 136 when the cowl latch 120 is in the locked position. The indicator 130, for example, may be about 5.5 inches in length and 2 inches in width.

For example, in some embodiments, when the cowl latch 120 is in the locked position, the indicator 132 may be in a permissive state where movement of the indicator 132 is permitted (e.g., an operator may manually move the indicator 132 from the open position 134 to the closed position while the indicator 132 is in the permissive state), while movement of the indicator 132 is inhibited or prevented when the cowl latch 120 is in the unlocked position. Accordingly, the indicator assembly 130 may be placed in the permissive state responsive to movement of the cowl latch 120 from the unlocked position to the locked position. In some embodiments, the indicator 132 may be urged by a spring toward the open position 134, with a pin or other mechanical stop securing the indicator 132 in place in the open position 134 when the cowl latch 120 is in the unlocked position. In the permissive state, however, the pin or other mechanical stop may be displaced, allowing an operator to overcome the spring force urging the indicator 132 toward the open position to manually move the indicator 132 to the closed position 136.

As another example, in some embodiments, the indicator 132 may automatically or autonomously (e.g., with operator intervention) move from the open position 134 to the closed position 136 responsive to movement of the cowl latch 120 to the locked position. For example, a spring that biases the indicator 132 open may be overcome automatically when the cowl latch 120 is moved to the locked position. Retraction of the indicator 132 to a position that is substantially flush with an exterior of the aircraft 101 is aerodynamically beneficial, while extension of the indicator 132 outward from the exterior of the aircraft 101 provides for convenient viewing of the indicator 132 when in the open position 134.

In the depicted embodiment, the indicator assembly 130 (e.g., the indicator 132) extends from an exterior 103 of the fan cowl 102 when the indicator assembly 130 is in the open position 134. Accordingly, the indicator 132 is visible from an exterior position of the aircraft 101 proximate at least one of a side 107 or an underside 109 of the aircraft 101 when the indicator assembly 130 (e.g., the indicator 132) is in the open position 134.

The example embodiment depicted in FIGS. 1 and 2 also includes a cable 140. The cowl latch 120 is operably coupled to the indicator assembly 130 via the cable 140. The condition and/or position of the cable 140 changes responsive to a change in the cowl latch 120 between the locked and unlocked position, with the indicator assembly 130 moving between (and/or becoming movable between) the open position 134 and the closed position 136 responsive to the change in the condition and/or position of the cable 140. In the depicted embodiment, the cable 140 extends along an interior surface 190 of the fan cowl 102 from the cowl latch 120 to the indicator assembly 130.

For example, in some embodiments, the cable 140 moves between a slack state and a tension state based on the locked or unlocked condition of the cowl latch 120, with a higher amount of tension in the cable in the tension state relative to the slack state. In the depicted embodiment, the cable 140 is configured to be in a slack state 142 when the cowl latch 120 is in the unlocked position (see FIG. 1), and to be in a tension state 144 when the cowl latch 120 is in the locked position (see FIG. 2). Also, the indicator assembly 132 is in the open position 134 when the cable 140 is in the slack state 142 (corresponding to the unlocked position of the cowl latch 120). The indicator assembly 132 is movable to the closed position 136 (e.g., manually or autonomously) when the cable 140 is in the tension state 144 (corresponding to the locked position of the cowl latch 120).

Figure 3A:
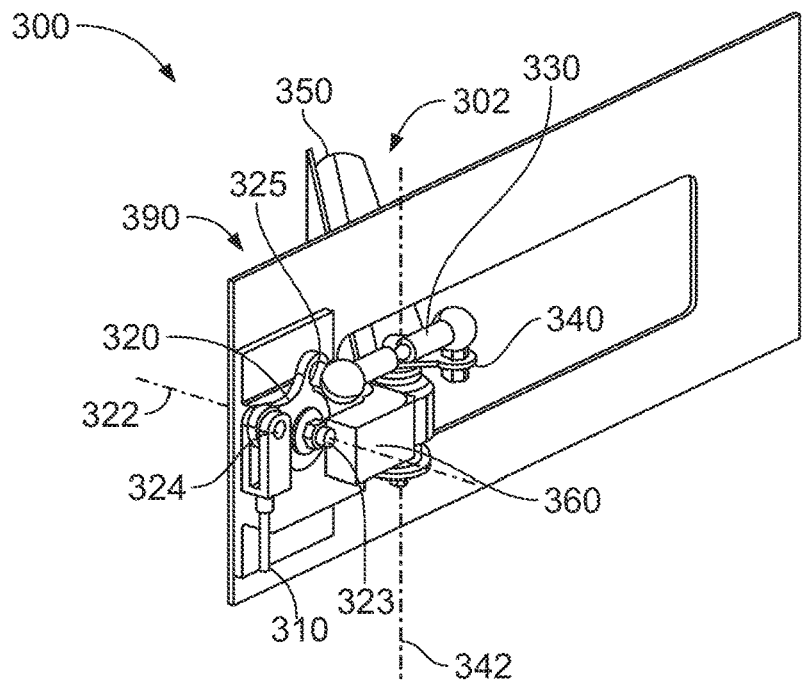
FIG. 3A provides a schematic perspective view of a latch indicator assembly in an open position in accordance with various embodiments.
Figure 3B:
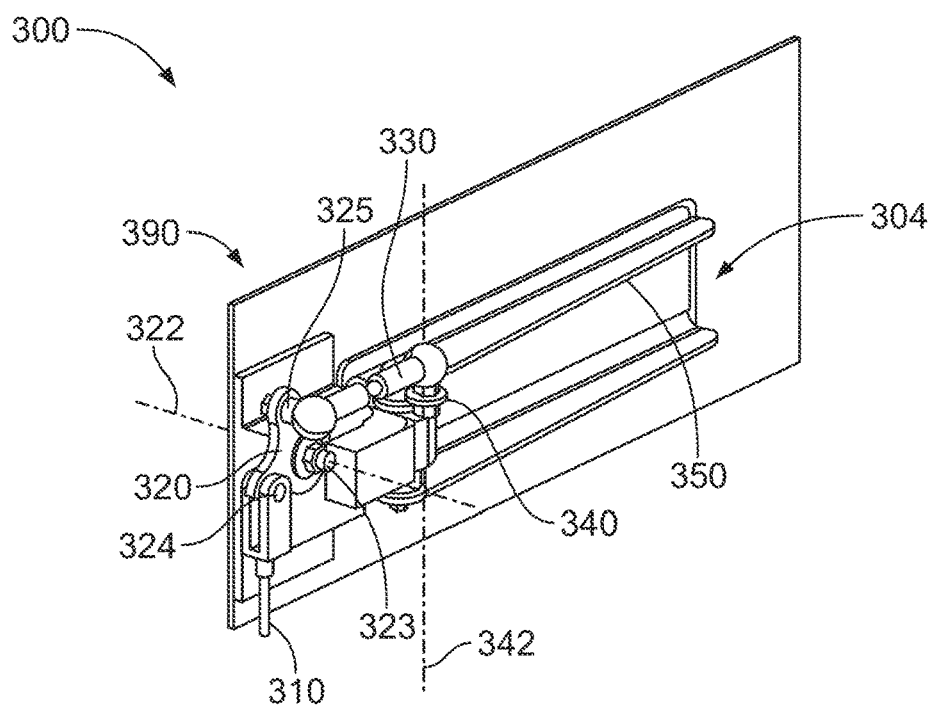
FIG. 3B provides a schematic perspective view of the latch indicator assembly of FIG. 3A in a closed position.

FIG. 3A provides a schematic perspective view of an indicator assembly 300 in an open position 302, and FIG. 3B provides a schematic perspective view of the indicator assembly 300 in a closed position 304. The indicator assembly 300 is an example of an indicator assembly that moves from a closed to open position responsive to a change in a cable state from a tension state to a slack state.

As seen in FIGS. 3A and 3B, the indicator assembly 300 includes a cable 310, a first rotating member 320, an arm 330, a second rotating member 340, an indicator 350, and a spring 360. The cable 310 is coupled at one end to the first rotating member 320, and is coupled at an opposite end to a cowl latch (not shown in FIGS. 3A and 3B). The cable 310 is in a tension state when the cowl latch 120 is in a locked condition and in a slack state when the cowl latch 120 is in an unlocked condition.

The first rotating member 320 is coupled to the cable 310 at a cable connection point 324. For example, the first rotating member 320 and cable 310 may be coupled by a corresponding pin (other members of the indicator assembly 300 may also be coupled by pins). The first rotating member 320 pivots about a first axis 322 at pivot point 323. The first axis 322 is oriented normal to an exterior 390 of an aircraft. The arm 330 is coupled to the first rotating member 320 at an arm connection point 325.

The second rotating member 340 is coupled to the arm 330 and the indicator 350. The second rotating member 340 pivots about a second axis 342. The second axis 342 is oriented perpendicular to the first axis 322. The spring 360 is a rotary spring disposed about the second axis 342 and configured to urge the indicator 350 toward the open position or bias the indicator 350 toward the open position. A change in the cable 310 from the slack state to the tension state rotates the first rotating member 320 about the first axis 322, and, due to the coupling of the first rotating member 320 with the second rotating member 340 via the arm 330, also rotates the second rotating member 340 about the second axis 342 causing the indicator to move from the open position to the closed position.

In the illustrated embodiment, when the cable 310 is in the slack condition, with the spring 360 urging the indicator 350 to rotate toward the open position, the first rotating member 320 is allowed to move clockwise as the arm 330 moves right (or away from the pivot point 323) under the urging of the spring 360 to move the indicator 350 to the open position (see FIG. 3A). However, when the cable 140 is placed under sufficient tension in the tension state, pulling downward on the cable connection point 324 to urge the first rotating member 320 to rotate counter-clockwise, the tension force from the cable 310 overcomes the spring force, rotating the first rotating member 320 counter-clockwise, pulling the arm 330 to the left (or toward the pivot point 323), and rotating the second rotating member 340 to move the indicator 350 to the closed position (see FIG. 3B). For example, in some embodiments, responsive to tightening of the cable 310, the cable connection point 324 may move downward about 0.5 inches resulting in a 45 degree rotation and opening of the indicator 350.

Figure 13A:
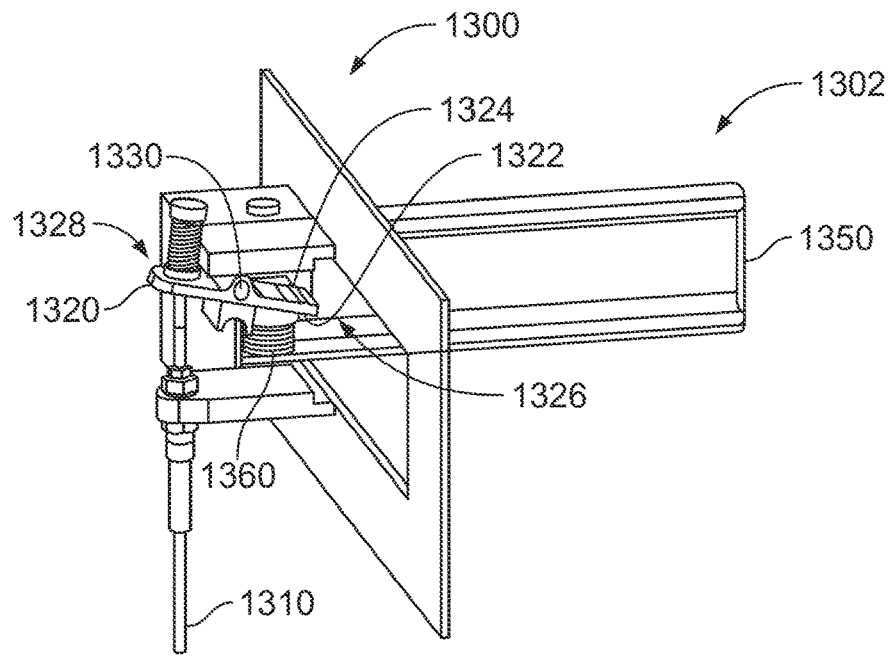
FIG. 13A provides a schematic perspective view of a latch indicator assembly in an open position in accordance with various embodiments.
Figure 13B:
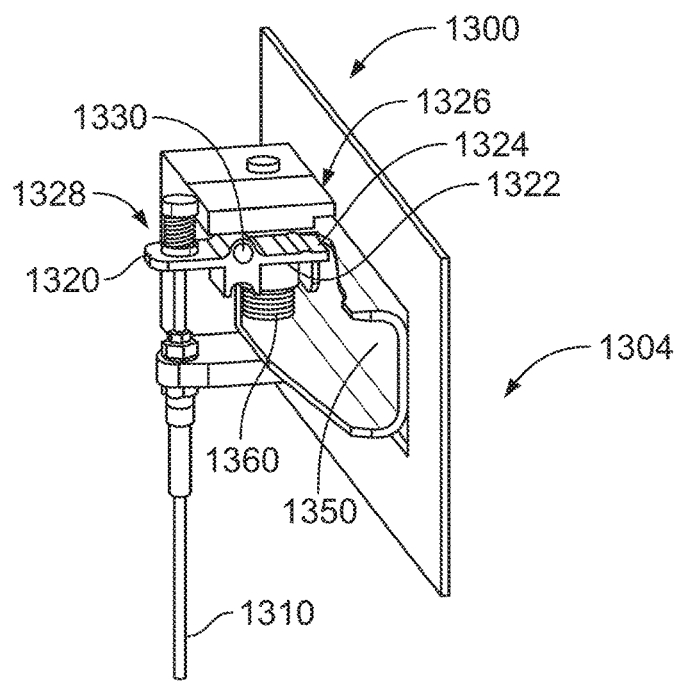
FIG. 13B provides a schematic perspective view of the latch indicator assembly of FIG. 13A in a closed position

It may be noted that FIGS. 3A and 3B illustrate an example indicator assembly that automatically or autonomously moves from the open to the closed position. In some embodiments, the indicator may be moved manually from the open to closed position. For example, FIG. 13A provides a schematic perspective view of an indicator assembly 1300 in an open position 1302, and FIG. 13B provides a schematic perspective view of the indicator assembly 1300 in a closed position 1304. The indicator assembly 1300 is an example of an indicator assembly that moves from a closed to open position responsive to a change in a cable state from a tension state to a slack state, and which may be manually moved from the open to closed position responsive to a change in cable state from a slack state to a tension state.

As seen in FIGS. 13A and 13B, the indicator assembly 1300 includes a cable 1310, a securement latch 1320, an indicator 1350, and a spring 1360. The securement latch 1320 is secured to an end of the cable 1310, and pivots about a pivot point 1330. The securement latch 1320 includes a sloped surface 1322 and a retention surface 1324 disposed on a latching end 1326, and a free end 1328 opposite the latching end 1326 (relative to the pivot point 1330). The spring 1360 urges the indicator 1350 toward the open position 1302.

In FIG. 13A, the cable 1310 is in a slack state, allowing the free end 1328 of the securement latch 1320 to move upward, and the latching end 1326 to move downward, releasing the indicator 1350 from the retention surface 1324, and allowing the indicator 1350 to move to the open position 1302 under the urging of the spring 1360. Accordingly, with the cable 1310 in a slack state, the securement latch 1320 is not in a position to retain the indicator 1350, and the indicator 1350 moves and/or remains in the open position 1302.

However, by closing and locking an associated cowl latch, the cable 1310 is placed into a tension state, which pulls the free end 1328 of the securement latch 1320 down, rotating the securement latch 1320 about the pivot point 1330, and moving the latching end 1326 into a position at which the indicator 1350 may be secured in the closed position. With the securement latch 1320 positioned as shown in FIG. 13B, the indicator 1350 may manually pushed inward from the position shown in FIG. 13A to the position shown in FIG. 13B. As the indicator 1350 approaches the closed position 1304, a surface of the indicator 1350 rides against the sloped surface 1322, rotating the securement latch 1320 slightly clockwise until the surface of the indicator 1350 has moved far enough for the securement latch to return to the position shown in FIG. 13B, with the retention surface 1324 of the securement latch 1320 acting as a stop to prevent the indicator 1350 in the closed position 1304 from opening. When the cowl latch is unlocked or opened, placing the cable 1310 in a slack state, the securement latch 1320 rotates counter-clockwise to the open position, allowing the indicator 1350, under the urging of the spring 1360, to move to the open position 1302.

Figure 4:
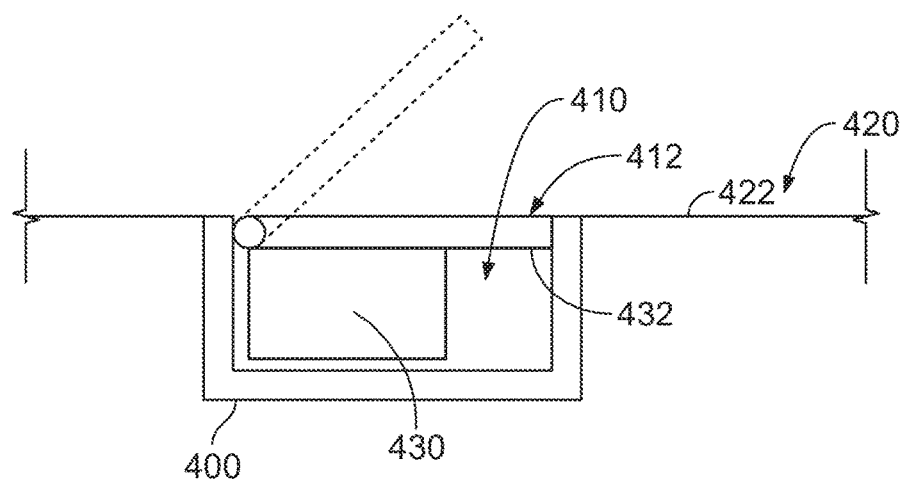
FIG. 4 provides a side schematic view of an indicator housing in accordance with various embodiments.

It may be noted that in various embodiments a latch indication assembly may be entirely or partially disposed within a housing at or near an exterior surface of an aircraft. FIG. 4 provides a side schematic view of a housing 400 in accordance with various embodiments. As seen in FIG. 4, the housing 400 defines a cavity 410. For example, the cavity 410 may be recessed into an exterior 422 of a fan cowl 420. An indicator assembly 430 (which may be generally similar, for example, to indicator assembly 130 and/or indicator assembly 300) is disposed at least partially within the housing 400. The indicator assembly 430 includes an indicator 432 (which may be generally similar, for example, to indicator 132 and/or indicator 350) that covers an opening 412 of the cavity 410 when the indicator 432 is in the closed position as shown in FIG. 4. In the illustrated example, the indicator 432 is disposed flush to the exterior 422 of the fan cowl 420 in the closed position. In the open position (shown in phantom lines in FIG. 4), the indicator 432 extends away from the exterior 422.

Figure 5:
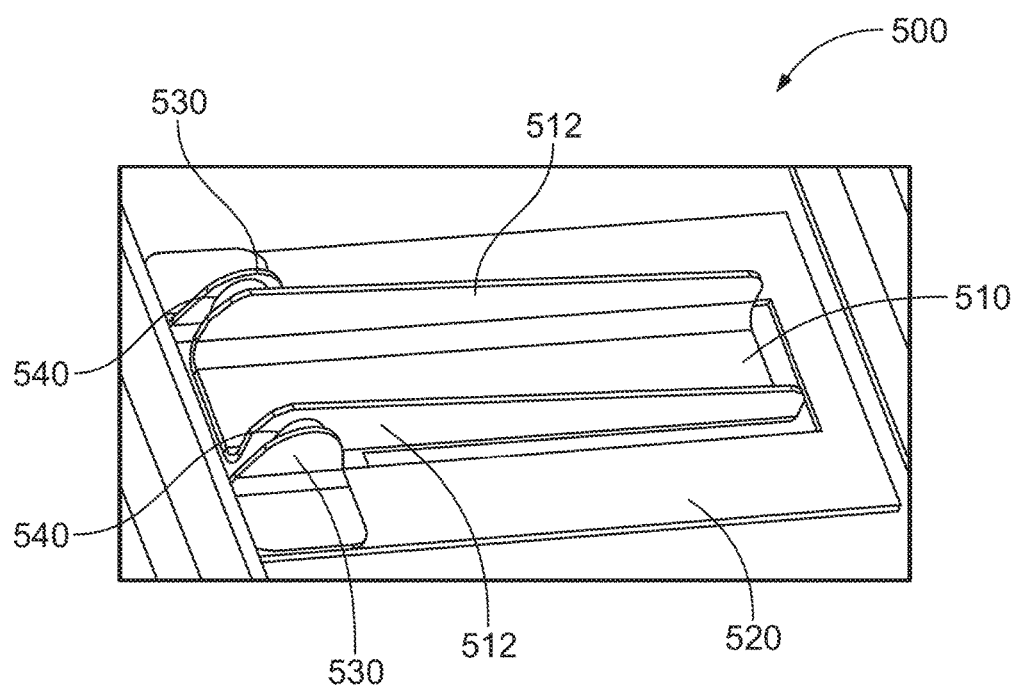
FIG. 5 depicts a schematic perspective view of an indicator assembly in accordance with various embodiments.

Various different mountings or arrangements may be utilized for indicator assemblies in various embodiments. As one example, FIG. 5 provides a perspective view of an indicator assembly 500 in accordance with various embodiments. The indicator assembly 500 includes an indicator 510. The indicator 510 is bent to include tabs 512. The indicator assembly 500 also includes a skin doubler 520, to which are mounted hinge clips 530 on either side of the indicator 510. The hinge clips 530 are coupled to the tabs 512 via springs 540 (e.g., rotary springs that bias the indicator 510 toward an open position). Accordingly, in the illustrated example, there is one spring 540 on each side of the indicator 510. The various components (e.g., indicator 510, hinge clips 530) may be made of bent sheet metal parts for ease of manufacturing.

Figure 6:
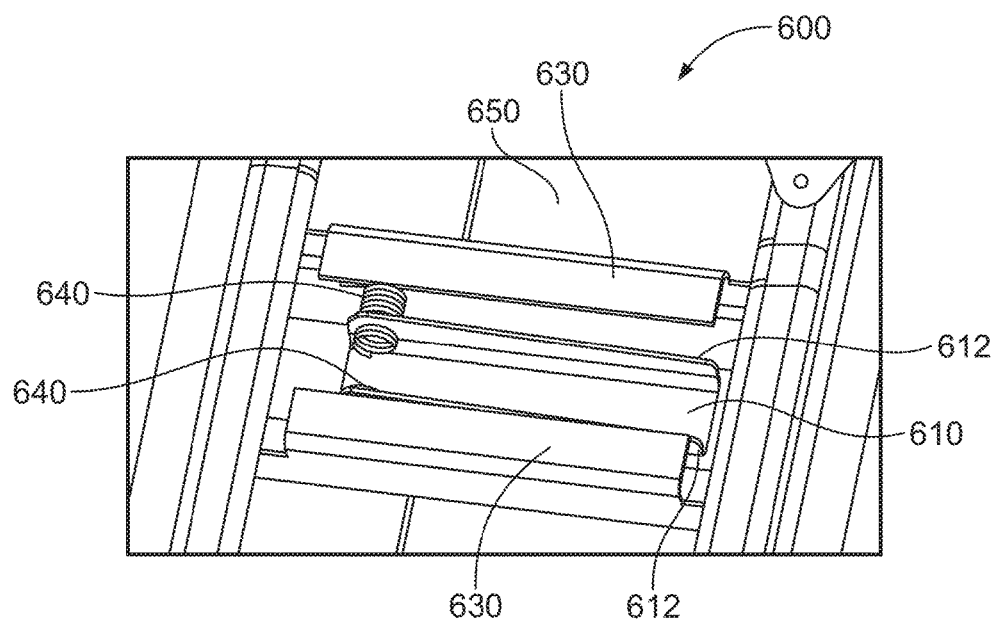
FIG. 6 depicts a schematic perspective view of an indicator assembly in accordance with various embodiments.

As another example, FIG. 6 provides a perspective view of an indicator assembly 600 in accordance with various embodiments. The indicator assembly 600 includes an indicator 610 that is bent to include tabs 612. The indicator assembly 600 also includes intercostals 630. The intercostals 630 are attached to the skin 650 of an aircraft. The indicator 610 is coupled (at the tabs 612) to the intercostals 630 via springs 640 (e.g., rotary springs that bias the indicator 610 toward an open position). Accordingly, in the illustrated example, there is one spring 640 on each side of the indicator 610. The various components (e.g., indicator 610, intercostals 630) may be made of bent sheet metal parts for ease of manufacturing. It may be noted that a cowl structure may be strengthened, for example, by the intercostals, with the strengthened structure used by mechanics to assist in opening the fan cowl.

Figure 7:
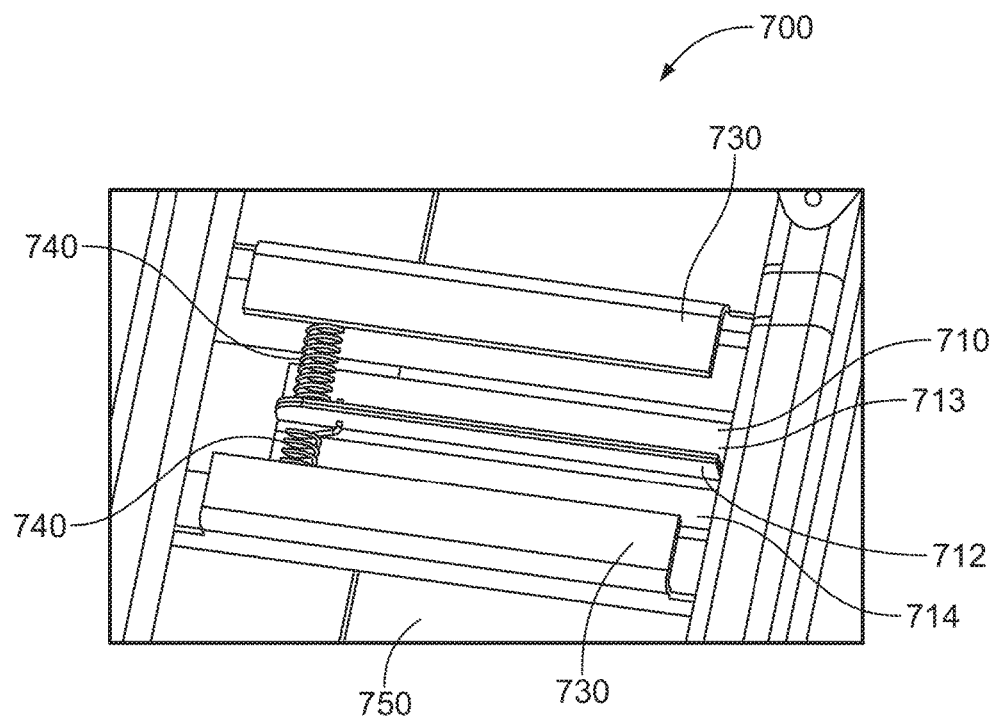
FIG. 7 depicts a schematic perspective view of an indicator assembly in accordance with various embodiments.

As one more example, FIG. 7 provides a perspective view of an indicator assembly 700 in accordance with various embodiments. The indicator assembly 700 includes an indicator 710 that is bent to include a central tab 712. For example, a first half 713 and a second half 714 may each be bent and joined at the central tab 712 to form the indicator 710. The indicator assembly 700 also includes intercostals 730. The intercostals 730 are attached to the skin 750 of an aircraft. The indicator 710 is coupled (at the central tab 712) to the intercostals 730 via springs 740 (e.g., rotary springs that bias the indicator 710 toward an open position). Accordingly, in the illustrated example, there is one spring 740 on each side of the central tab 712. The various components (e.g., indicator 710, intercostals 730) may be made of bent sheet metal parts for ease of manufacturing. It may further be noted that, in embodiments utilizing intercostals, the intercostals may be turned with respect to the skin 750 of the aircraft.

Figure 8:
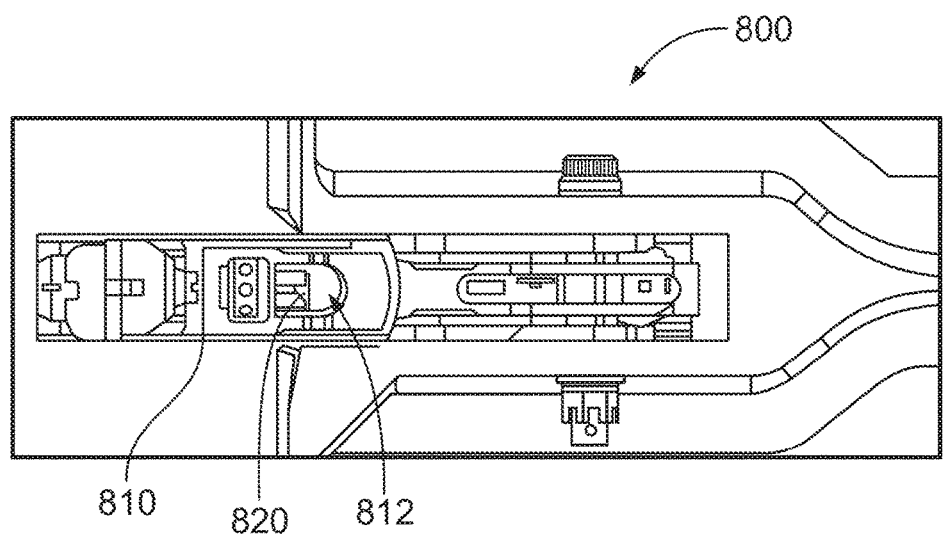
FIG. 8 depicts a schematic top view of welding latch assembly in accordance with various embodiments.

It may be noted that, in various embodiments, an existing or conventional latch may be modified for use with an indicator assembly. As one example, FIG. 8 provides a top view of a latch assembly 800 in accordance with various embodiments. The latch assembly 800 is shown in an unlocked position in FIG. 8. The latch assembly 800 includes a main handle 810 to which a cable may be attached. The latch assembly 800 also includes a cavity 812 through which the cable may be routed. An existing or conventional latch may be modified, for example, to include an attachment point 820 to the main handle 810 for connection to the cable.

Figure 9:
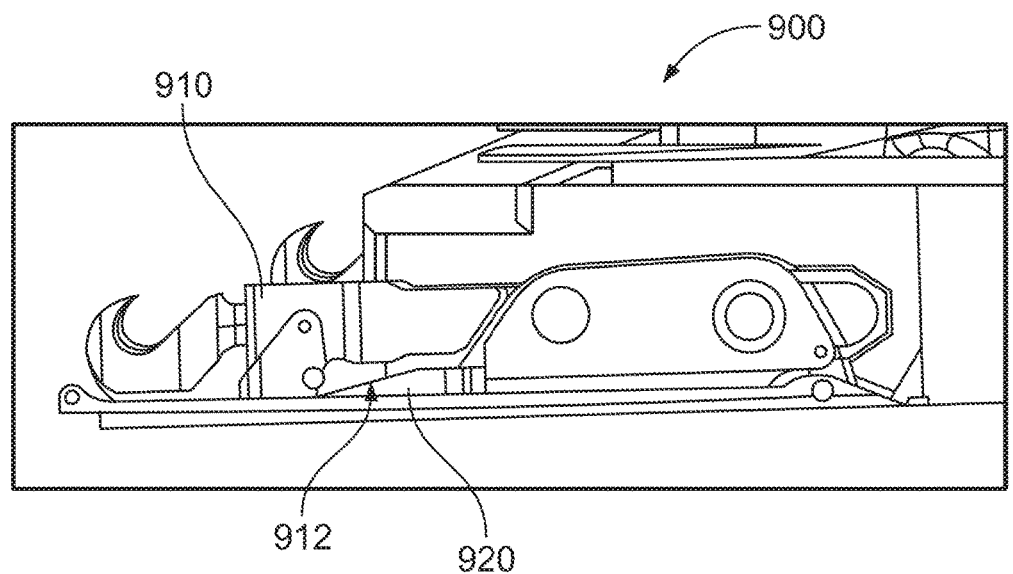
FIG. 9 depicts a schematic side view of welding latch assembly in accordance with various embodiments.

As another example, FIG. 9 provides a side view of a latch assembly 900 in accordance with various embodiments. The latch assembly 900 is shown in an unlocked position in FIG. 9. The latch assembly 800 includes a main handle 910 and a latch housing 920. A cable may be attached to the main handle 910 at attachment point 912, with the cable routed between the main handle 910 and the latch housing 920. An existing or conventional latch may be modified for example, to use a replacement main handle 910 including attachment point 912 for connection to the cable.

It may be noted that the particular examples discussed herein are provided by way of example and not limitation, and that other arrangements used. For example, instead of modifying an existing latch, a new latch design tailored for use with an indicator assembly may be used. Generally, in various embodiments, a latch is generally configured to provide for a physical coupling to an indicator assembly (e.g., via a cable or mechanical linkage), with a motion and/or state of the cable or mechanical linkage corresponding to a locked or unlocked position used to place the indicator assembly in a closed or open position. For example, as discussed herein, a tension state of a cable may correspond to a locked position and a slack position correspond to an unlocked position; however, in other embodiments, a tension state of a cable may correspond to an unlocked position and a slack position correspond to a locked position of the latch.

Figure 10:
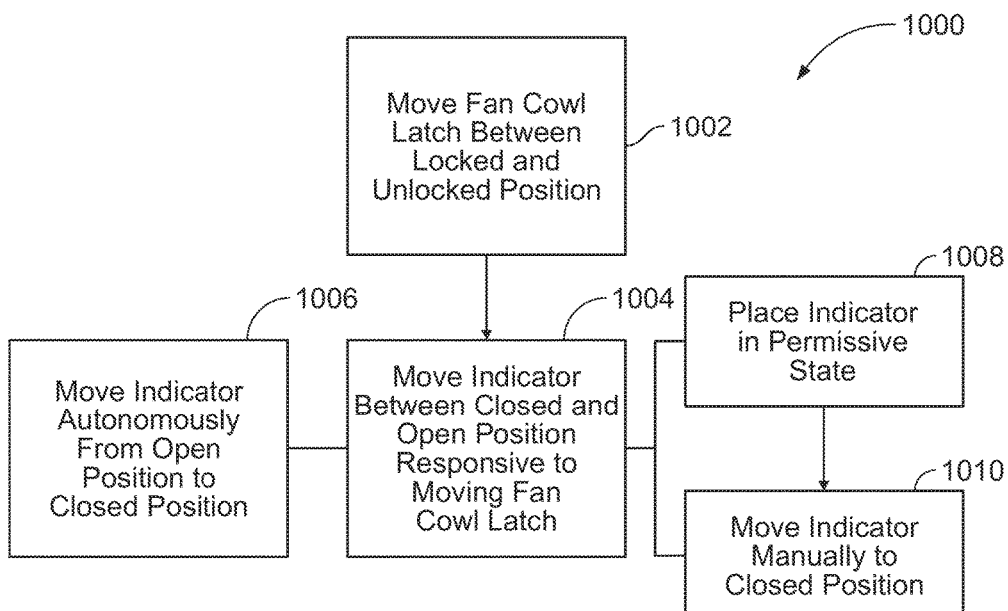
FIG. 10 provides a flow chart of a method in accordance with various embodiments.

FIG. 10 provides a flowchart of a method 1000 (e.g., a method for indicating if a latch (such as a fan cowl latch) is in a locked or unlocked position). The method 1000, for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 1002, a fan cowl latch (e.g., cowl latch 120) of a fan cowl (e.g., fan cowl 102) is moved between an unlocked state or position and a locked state or position. For example, when the fan cowl latch is moved to the unlocked state, the fan cowl may be opened and/or removed to provide access to an engine for inspection, maintenance, and/or repair. The fan cowl latch may be moved to the locked state to secure the fan cowl in place for flight. Because it is undesirable for an aircraft to fly without the fan cowl latch in the locked position, an indicator is provided in various embodiments to provide a visual confirmation of whether or not the fan cowl latch is in the locked position.

At 1004, an indicator (e.g., indicator 132) of an indicator assembly (e.g., indicator assembly 130) is moved between a closed position and an open position responsive to the moving of the fan cowl latch at 1002. For example, when the latch moves from the locked position to the unlocked position, the indicator may be responsively moved to the open position. Or, when the latch moves from the unlocked position to the locked position, the indicator may be responsively moved to the closed position. In the closed position, the indicator is flush with an exterior of the fan cowl. In the open position, the indicator extends outward from the exterior of the fan cowl. Accordingly, the indicator is aerodynamically positioned when the latch assembly is in the locked position, and easily visible when the latch assembly is in the unlocked position.

Various mechanisms or assemblies may be used in different embodiments to move or position the indicator responsive to latch condition (e.g., locked or unlocked). For example, a cable coupling the fan cowl latch to the indicator assembly may be employed. In some embodiments, moving the cable from a slack state to a tension state responsive to movement of the latch from the unlocked state to the locked state may move the indicator from the open position to the closed position. Also, moving the cable from the tension state to the slack state responsive to movement of the latch from the locked state to the unlocked state may move the indicator from the closed position to the open position.

The movement of the indicator to the closed position may be manually performed or automatic. For example, at 1006, the indicator is moved from the open position to the closed position autonomously responsive to moving the fan cowl latch from the unlocked state to the locked state.

In other embodiments, the indicator may be moved manually to the closed position. For example, at 1008, the indicator is placed in a permissive state responsive to moving the latch from the unlocked to the locked position. In some embodiments, the indicator may be biased toward the open position (e.g., by a spring and/or gravitational force) and locked or secured in the open position via a pin or mechanical stop when the latch is in the unlocked position. When the latch is moved from the unlocked position to the locked position, the pin or mechanical stop may be removed or displaced (e.g., responsive to a cable movement or change in cable state) to place the indicator in the permissive state, allowing a manually applied force to move the latch to closed position. For example, at 1010, with the indicator in the permissive state, the indicator is manually moved from the open position to the closed position. In some embodiments, as part of a pre-flight inspection or check, an operator may confirm the locked status of the fan cowl latch by pressing against the indicator in the open position. If the indicator is prevented or inhibited from closing, the operator may lock the latch. However, if the indicator may be moved to the closed position, the latch may be confirmed as being locked. If the latch is moved from the locked position to the unlocked position, the indicator may be returned to the open position and the pin or mechanical stop replaced (e.g., responsive to a cable movement or change in cable state).

Figure 11:
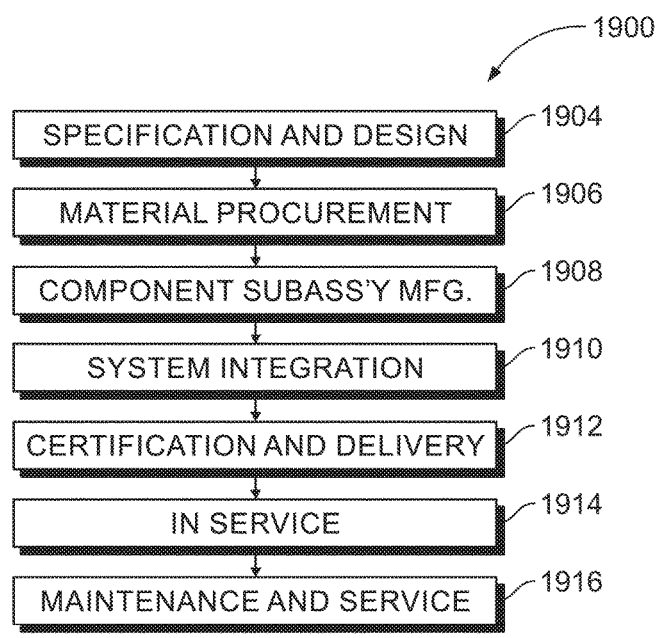
FIG. 11 is a block diagram of aircraft production and service methodology.

Examples of the present disclosure may be described in the context of aircraft manufacturing and service method 1900 as shown in FIG. 11 and aircraft 1902 as shown in FIG. 11. During pre-production, illustrative method 1900 may include specification and design (block 1904) of aircraft 1902 and material procurement (block 1906). During production, component and subassembly manufacturing (block 1908) and system integration (block 1910) of aircraft 1902 may take place. Thereafter, aircraft 1902 may go through certification and delivery (block 1912) to be placed in service (block 1914). While in service, aircraft 1902 may be scheduled for routine maintenance and service (block 1916). Routine maintenance and service may include modification, reconfiguration, refurbishment, etc. of one or more systems of aircraft 1902. For example, in various embodiments, examples of the present disclosure may be used in conjunction with one or more of blocks 1908, 1912, 1914, or 1916.

Each of the processes of illustrative method 1900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 1902 produced by illustrative method 1900 may include airframe 1918 with a plurality of high-level systems 1920 and interior 1922. Examples of high-level systems 1920 include one or more of propulsion system 1924, electrical system 1926, hydraulic system 1928, and environmental system 1930. Any number of other systems may be included. Although an aerospace example is shown, the principles disclosed herein may be applied to other industries, such as the automotive industry. Accordingly, in addition to aircraft 1902, the principles disclosed herein may apply to other vehicles, e.g., land vehicles, marine vehicles, space vehicles, etc. In various embodiments, examples of the present disclosure may be used in conjunction with airframe 1918.

Apparatus(es) and method(s) shown or described herein may be employed during any one or more of the stages of the manufacturing and service method 1900. For example, components or subassemblies corresponding to component and subassembly manufacturing 1908 may be fabricated or manufactured in a manner similar to components or subassemblies produced while aircraft 1902 is in service. Also, one or more examples of the apparatus(es), method(s), or combination thereof may be utilized during production stages 1908 and 1910, for example, by substantially expediting assembly of or reducing the cost of aircraft 1902. Similarly, one or more examples of the apparatus or method realizations, or a combination thereof, may be utilized, for example and without limitation, while aircraft 1902 is in service, e.g., maintenance and service stage (block 1916).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It should be noted that the particular arrangement of components (e.g., the number, types, placement, or the like) of the illustrated embodiments may be modified in various alternate embodiments. For example, in various embodiments, different numbers of a given component may be employed, a different type or types of a given component may be employed, a number of components (or aspects thereof) may be combined, a given component may be divided into plural components, one or more aspects of one or more components may be shared between components, a given component may be added, or a given component may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A latch indication assembly comprising:
a latch movable between a locked position and an unlocked position, the latch configured to secure a fan cowl of an aircraft;
an indicator assembly operably coupled to the latch, the indicator assembly including an indicator movable between an open position and a closed position responsive to movement of the latch, the indicator extending from an exterior of the fan cowl when in the open position, wherein the indicator is visible from an exterior position proximate at least one of a side or an underside of the aircraft when in the open position, wherein the indicator assembly extends to the open position when the latch is in the unlocked position, wherein the indicator assembly is configured to be retractable to the closed position when the latch is in the locked position, and
a cable, the latch operably coupled to the indicator assembly via the cable, wherein the cable is configured to be in a slack state when the latch is in the unlocked position, wherein the cable is configured to be in a tension state when the latch is in the locked position, wherein the indicator assembly is in the open position when the cable is in the slack state, and wherein the indicator assembly is movable to the closed position when the cable is in the tension state.

2. The latch indication assembly of claim 1, wherein the indicator assembly is configured to automatically move to the closed position responsive to movement of the latch to the locked position.

3. The latch indication assembly of claim 1, wherein the indicator assembly further comprises:
a first rotating member coupled to the cable, the first rotating member configured to pivot about a first axis oriented normal to an exterior of an aircraft;
an arm coupled to the first rotating member; and
a second rotating member coupled to the arm and to the indicator, the second rotating member configured to pivot about a second axis oriented perpendicular to the first axis, wherein a change in the cable from the slack state to the tension state rotates the first rotating member about the first axis and the second rotating member about the second axis causing the indicator to move from the open position to the closed position.

4. The latch indication assembly of claim 1, further comprising a housing, the housing defining a cavity, the indicator assembly disposed within the housing, the indicator covering an opening of the cavity when the indicator is in the closed position.

5. The latch indication assembly of claim 1, wherein the indicator assembly is configured to be placed in a permissive state responsive to movement of the latch from the unlocked to the locked position, wherein the indicator is configured to be manually moved from the open position to the closed position when the indicator assembly is in the permissive state.

6. The latch indication assembly of claim 1, wherein the indicator assembly comprises a spring operably coupled to the indicator, wherein the spring biases the indicator toward the open position.

7. A method comprising:
moving a fan cowl latch of a fan cowl between an unlocked position and a locked position;
responsive to the moving the latch, moving an indicator of an indicator assembly between a closed position that is flush with an exterior of the fan cowl and an open position that extends outward from the exterior of the fan cowl,
wherein moving the indicator from the open position to the closed position comprises moving a cable operably coupled to the indicator assembly and the latch from a slack state to a tension state responsive to movement of the latch from the unlocked position to the locked position, and wherein moving the indicator from the closed position to the open position comprises moving the cable from the tension state to the slack state responsive to movement of the latch from the locked position to the unlocked position.

8. The method of claim 7, wherein moving the indicator from the open position to the closed position is performed autonomously responsive to moving the fan cowl latch from the unlocked position to the locked position.

9. The method of claim 7, wherein moving the indicator from the open position to the closed position comprises:
placing the indicator in a permissive state responsive to moving the latch from the unlocked position to the locked position; and
manually moving the indicator from the open position to the closed position with the indicator in the permissive state.

10. The method of claim 7, wherein moving the indicator from the open position to the closed position comprises urging the indicator to the closed position against a force provided by a spring biased to urge the indicator toward the open position.

11. A fan cowl assembly comprising:
a fan cowl;
a fan cowl latch operably coupled to the fan cowl and movable between a locked and unlocked position;
an indicator assembly operably coupled to the fan cowl latch, the indicator assembly including an indicator movable between an open position and a closed position responsive to movement of the fan cowl latch, wherein the indicator assembly extends to the open position when the fan cowl latch is in the unlocked position, and wherein the indicator assembly is configured to be retractable to the closed position when the fan cowl latch is in the locked position; and
a cable, the fan cowl latch operably coupled to the indicator assembly via the cable, the cable extending along an interior surface of the fan cowl from the fan cowl latch to the indicator assembly, wherein the cable is configured to be in a slack state when the fan cowl latch is in the unlocked position, wherein the cable is configured to be in a tension state when the fan cowl latch is in the locked position, wherein the indicator assembly is in the open position when the cable is in the slack state, and wherein the indicator assembly is movable to the closed position when the cable is in the tension state.

12. The fan cowl assembly of claim 11, wherein the indicator assembly is configured to automatically move to the closed position responsive to movement of the fan cowl latch to the locked position.

13. The fan cowl assembly of claim 11, further comprising a housing, the housing defining a cavity recessed into an exterior of the fan cowl, the indicator assembly disposed within the housing, the indicator covering an opening of the cavity when the indicator is in the closed position.

14. The fan cowl assembly of claim 13, wherein the indicator is disposed flush to the exterior of the fan cowl in the closed position.

15. The fan cowl assembly of claim 11, wherein the indicator assembly comprises a spring operably coupled to the indicator, wherein the spring biases the indicator toward the open position.

\* \* \* \* \*